(12) United States Patent
McDougal

(10) Patent No.: US 11,547,084 B2
(45) Date of Patent: Jan. 10, 2023

(54) MILKING PLATFORM

(71) Applicant: Waikato Milking Systems Limited Partnership, Hamilton (NZ)

(72) Inventor: Graeme David McDougal, Hamilton (NZ)

(73) Assignee: Waikato Milking Systems Limited Partnership, Hamilton (NZ)

( * ) Notice: Subject to any disclaimer, the term of this patent is extended or adjusted under 35 U.S.C. 154(b) by 55 days.

(21) Appl. No.: 16/537,861

(22) Filed: Aug. 12, 2019

(65) Prior Publication Data

US 2019/0373850 A1 Dec. 12, 2019

(30) Foreign Application Priority Data

Jun. 12, 2018 (NZ) ........................................ 743408

(51) Int. Cl.
| | |
|---|---|
| *A01K 1/12* | (2006.01) |
| *B65G 13/02* | (2006.01) |
| *B60S 13/02* | (2006.01) |
| *B61J 1/00* | (2006.01) |
| *B65G 47/28* | (2006.01) |

(52) U.S. Cl.
CPC .............. *A01K 1/126* (2013.01); *B60S 13/02* (2013.01); *B61J 1/00* (2013.01); *B65G 13/02* (2013.01); *B65G 47/28* (2013.01)

(58) Field of Classification Search
CPC . A01K 1/126; B60S 13/02; B61J 1/00; B65G 13/02; B65G 47/28
USPC ...................................................... 198/469.1
See application file for complete search history.

(56) References Cited

U.S. PATENT DOCUMENTS

| | | | | |
|---|---|---|---|---|
| 1,566,492 A | * | 12/1925 | McGinness | ............. B61C 11/04 |
| | | | | 105/30 |
| 7,798,067 B2 | * | 9/2010 | Starnes | ..................... E04H 6/40 |
| | | | | 104/44 |
| 9,574,607 B2 | * | 2/2017 | Strom | ..................... F16C 13/00 |

(Continued)

FOREIGN PATENT DOCUMENTS

JP         2004067320 A    *    3/2004

*Primary Examiner* — Gene O Crawford
*Assistant Examiner* — Lester III Rushin
(74) *Attorney, Agent, or Firm* — Clark & Brody LP

(57) ABSTRACT

A rotary milking platform 1 has a deck 2, a circular upper beam 4 connected to and supporting the deck, a circular lower beam 6 and a series of carriages 5 connected end to end to form a ring between the beams. The platform is formed such that the upper beam 4 is arranged to rest and rotate on the ring of carriages 5 to rotate the deck 2. Each carriage has at least one carriage roller 10, and each roller 10 arranged to rotate on the lower beam 4. Each roller 10 also has a retention flange 11 at only one side. The flanges 11 of some of the rollers 10 are at or adjacent an inner side of the ring, and the flanges 11 of others of the rollers are at or adjacent an outer side of the ring. The rollers 10 of the ring are arranged such that at least one roller is oriented with its flange 11 on an opposite side to another of the flanged rollers immediately adjacent to it. The flanges prevent the carriages from moving off the lower beam 4 when the platform 1 is in use. Further, at least some of the carriages can be disconnected from the ring and swung laterally to be moved free of the beams 4, 6 for maintenance, repair or replacement.

11 Claims, 7 Drawing Sheets

(56) References Cited

U.S. PATENT DOCUMENTS

| | | | |
|---|---|---|---|
| 10,036,419 B2 * | 7/2018 | Hellekant | F16C 19/507 |
| 11,434,553 B2 * | 9/2022 | Zhang | C21D 1/18 |

* cited by examiner

Figure 11
Figure 11a
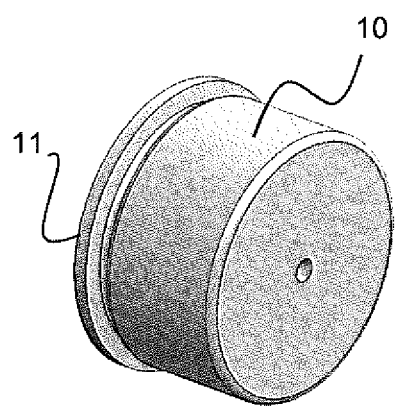
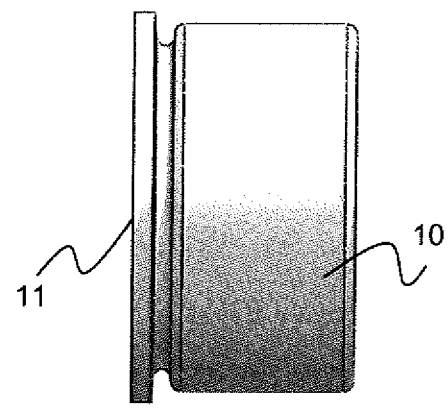
Figure 12
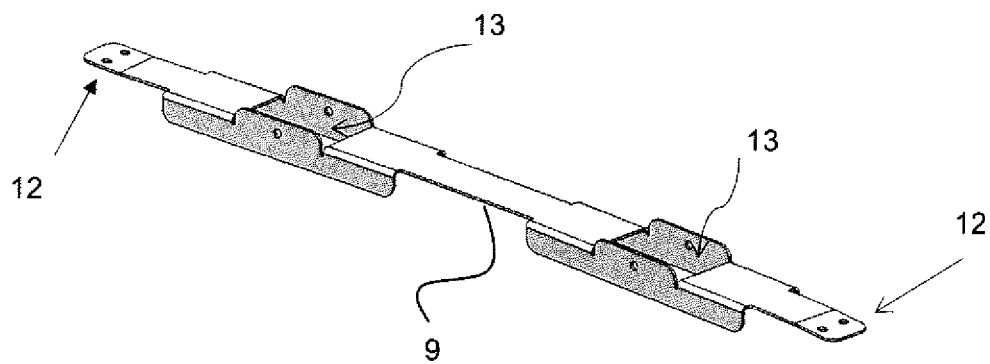

MILKING PLATFORM

FIELD OF THE INVENTION

A preferred form of the invention relates to a platform for milking dairy cows.

BACKGROUND

It is known to locate dairy cows in bales on a rotary platform and to milk them as the platform turns through one revolution. Such platforms have an annular deck supported on at least one circular beam that rotates on rollers to move the platform with it. The beam takes the majority of the weight of the deck, milking equipment and cows, and that load is transmitted to the rollers. The weight can be substantial, particularly with platforms designed to take many cows and this can lead to deterioration of the rollers. Repair work, for example to replace the rollers, can be unduly inconvenient and cause economic loss through excessive downtime.

OBJECT OF THE INVENTION

It is an object of preferred embodiments of the invention to go at least some way towards addressing the above problem. While this applies to preferred embodiments, it should be understood that the object of the invention per se is not so limited; it is simply to provide a useful choice. Therefore any objects or benefits applicable to preferred embodiments should not be read as a limitation on claims expressed more broadly.

Definitions

The term "comprising" if and when used in this document in relation to a combination of features or steps does not rule out the option of there being further unnamed features. The term is therefore inclusive, not exclusive.

SUMMARY OF THE INVENTION

In one aspect of the invention there is provided a rotary milking platform comprising:
  a deck;
  a circular upper beam connected to and supporting the deck;
  a circular lower beam; and
  a series of carriages connected end to end to form a ring between the beams;
  the platform formed such that:
  the upper beam is arranged to rest and rotate on the ring of carriages to rotate the deck;
  each carriage has at least one carriage roller;
  each carriage roller is arranged to rotate on the lower beam;
  each carriage roller has a retention flange at only one side;
  the flanges of some of the rollers are at or adjacent an inner side of the ring and the flanges of others of the rollers are at or adjacent an outer side of the ring;
  the flanged rollers of the ring are arranged such that at least one roller is oriented with its flange on an opposite side of the ring to another of the flanged rollers immediately adjacent to it;
  the flanges prevent the carriages from moving off the lower beam when the platform is in use; and
  at least some of the carriages can be disconnected from the ring and swung laterally to be moved free of the beams for maintenance, repair or replacement.

Optionally the platform is such that:
  each carriage has at least a pair of the carriage rollers;
  the flanges within each pair are at opposite sides of the carriage; and
  at least some of the carriages can be disconnected and swung laterally to move their carriage rollers free of the beams.

Optionally the rollers are arranged in pairs, and each pair is oriented with their flanges on an opposite side of the ring of carriages to a pair of immediately adjacent rollers of the ring.

Optionally the lower beam is stationary.

Optionally the ring of carriages is free to the extent that it can rotate at a different rate to the upper beam.

Optionally each flange overlaps an upright side of the lower beam and an upright side of the upper beam.

Optionally each carriage is releasably connected to another of the carriages immediately before it, and to another of the carriages immediately after it.

Optionally each carriage has a chassis and at least two carriage rollers, the chassis having at least two internal spaces which receive those rollers, respectively.

Optionally an axle passes through each carriage roller and fastens that roller to the chassis.

Optionally the carriages are curved to match the curvature of the upper and lower beams.

Optionally the milking platform of any of the first two summary statements given above is such that at the same time:
  the lower beam is stationary;
  the ring of carriages is free to the extent that it can rotate at a different rate to the upper beam;
  each flange overlaps an upright side of the lower beam and an upright side of the upper beam;
  each carriage is releasably connected to another of the carriages immediately before it, and to another of the carriages immediately after it;
  each carriage has a chassis connected to at least two carriage rollers, the chassis having at least two internal spaces which receive those rollers, respectively;
  an axle passes through each carriage roller and fastens that roller to the chassis;
  the carriages are curved to match the curvature of the upper and lower beams;
  the ring of carriages is substantially circular; and
  each roller has an axis that is radially aligned with a centre of the ring.

According to a further aspect of the invention there is provided a method of replacing at least one carriage roller of a rotary milking platform according to any of the preceding statements, comprising the steps of:
  disconnecting the carriage from immediately adjacent carriages,
  swinging the disconnected carriage laterally to position its roller(s) clear of the upper and lower beams;
  replacing at least one carriage roller;
  swinging the carriage into alignment with the beams; and
  connecting the carriage to two immediately adjacent carriages.

DRAWINGS

Some preferred embodiments of the invention will now be described by way of example, and with reference to the accompanying drawings, of which:

FIG. 11 is an isometric view of a roller forming part of the carriage;

FIG. 11a is a side view of the carriage's roller;

FIG. 12 is an isometric view of a chassis forming part of the carriage;

DETAILED DESCRIPTION

Figure 1:
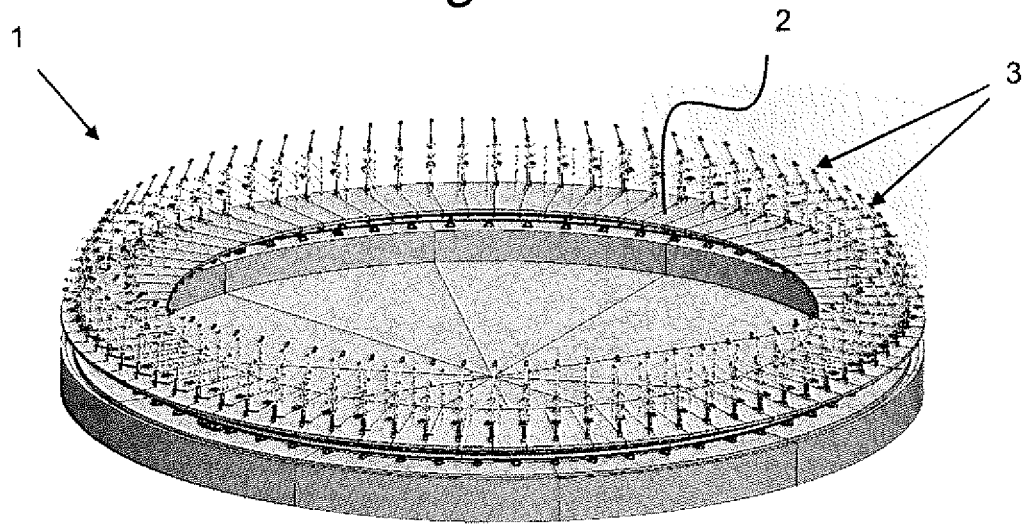
FIG. 1 is a an isometric view of a rotary milking platform for dairy cows.
Figure 2:
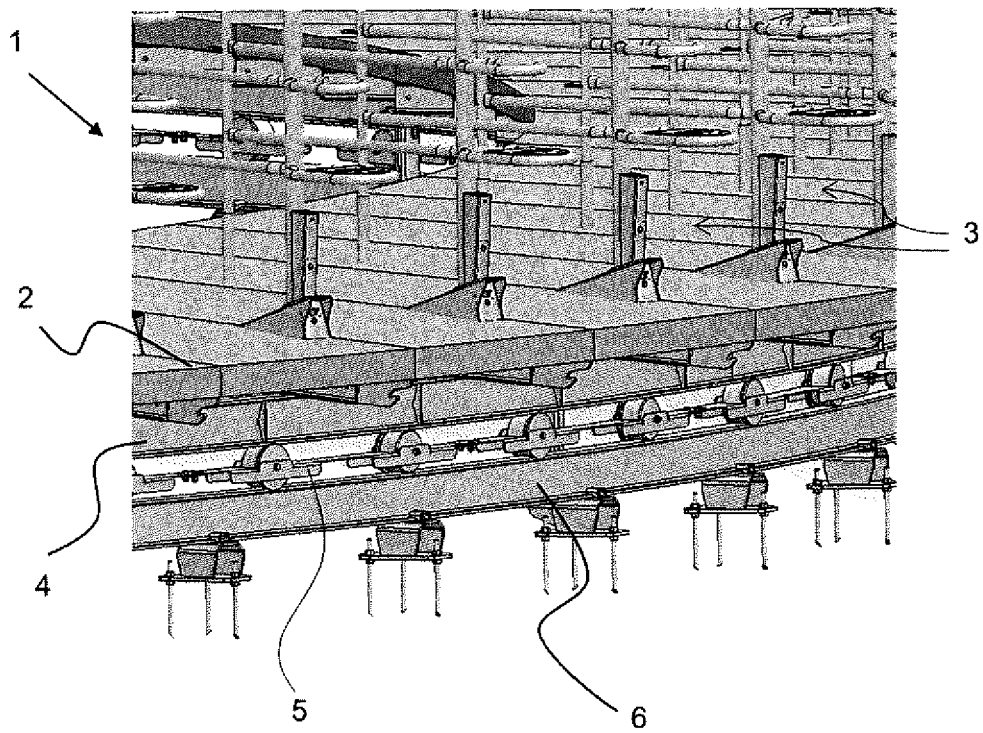
FIG. 2 illustrates mechanical detail of the platform.

Referring to FIGS. 1 and 2, the milking platform 1 has a deck 2 which is divided up into a series of milking bales 3. Preferably the deck is formed from a series of molded resinous pre-fabricated modular segments, each having an inner radial end and an outer radial end. Dairy cows are ushered into the bales, are milked as the deck goes through one revolution and are then ushered off the deck. As each cow leaves it is replaced by another cow in a queue.

Figure 3:
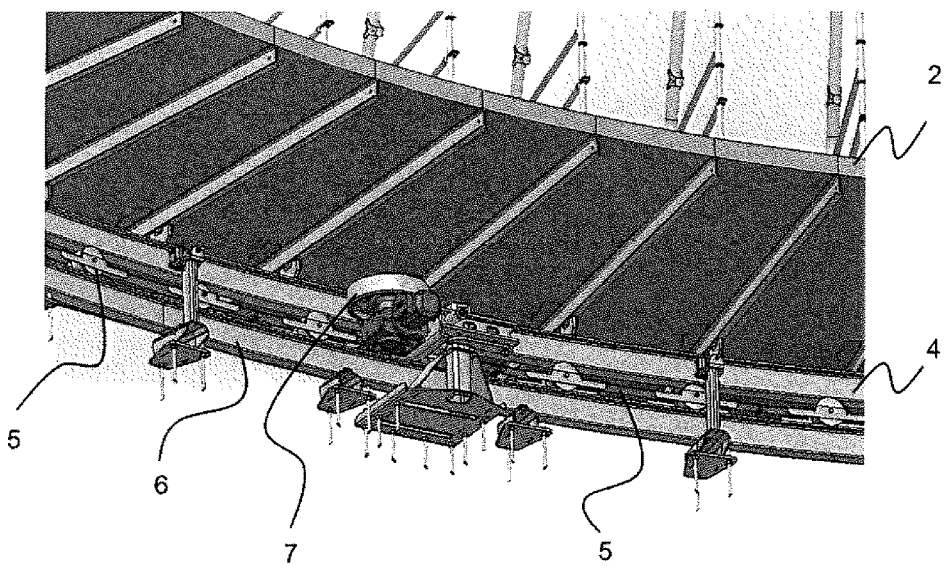
FIG. 3 illustrates part of the platform from beneath.

Referring to FIGS. 2 and 3, the deck 2 is secured to and supported on a circular upper beam 4. As that beam rotates, so does the deck. More specifically, the upper beam 4 is supported on a ring of carriages 5, which is in turn supported on a stationary circular lower beam 6. The upper beam 4 turns on or with the ring of carriages 5, which in turn rotates on the lower beam 6.

Figure 4:
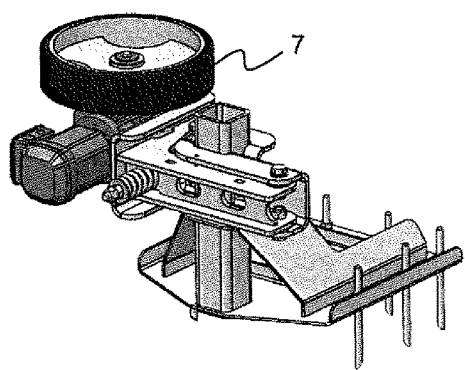
FIG. 4 is an isometric view of a drive roller forming part of the platform.
Figure 5:
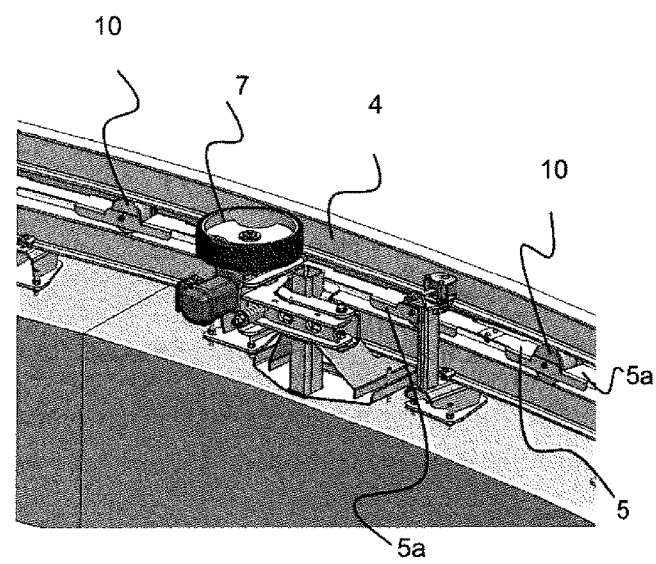
FIG. 5 shows detail of the platform from above, with its deck removed.

Referring to FIGS. 3, 4 and 5, the platform has several drive rollers 7 that bear against the upper beam 4 from within its circular perimeter. This causes that beam 4, and therefore the deck 2, to rotate. As the upper beam 4 rotates the ring of carriages 5 does likewise. Preferably the ring of carriages is not fastened to either beam but rather 'floats' between the two. The ring of carriages 5 may not rotate at the same rate as the upper beam 4, for example it may only turn about half as fast. In some alternative embodiments, the ring of carriages may be connected to the upper beam.

Preferably there are three of the drive rollers 7 spaced evenly around the upper beam 4. In other embodiments there may be fewer (for example two), or more (for example four), of the drive rollers.

Figure 6:
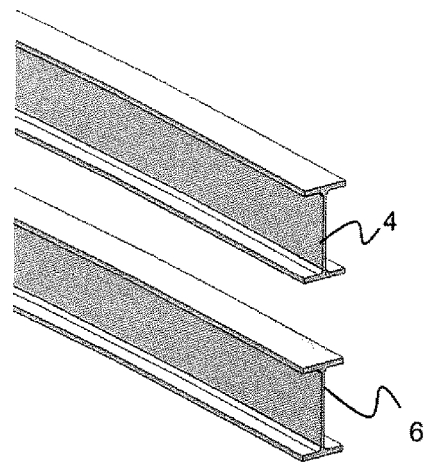
FIG. 6 is an isometric view of a portion of each of upper and lower support beams that form part of the platform.
Figure 7:
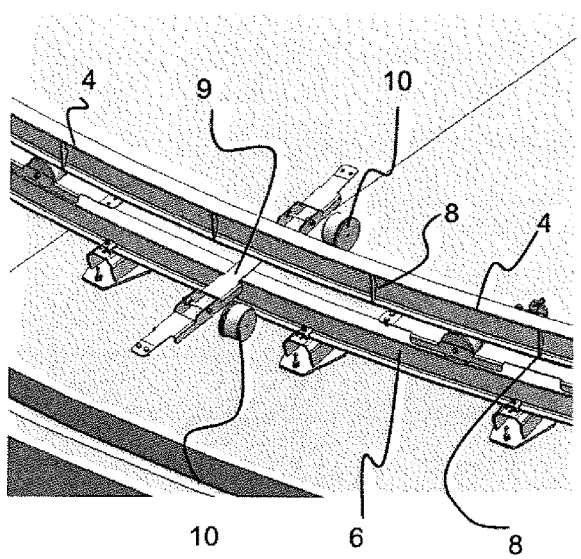
FIG. 7 is an isometric view of the platform from above, without its deck, illustrating how one of its carriages can be manipulated for repair.

Referring to FIGS. 6 and 7, the upper beam 4 is 'I-shaped' in transverse cross section, with strengthening gussets 8 along one side. The lower beam 6 is also 'I-shaped', but in this embodiment it does not have strengthening gussets. An 'I-shape' is not essential for either beam, but it is preferred.

Figure 8:
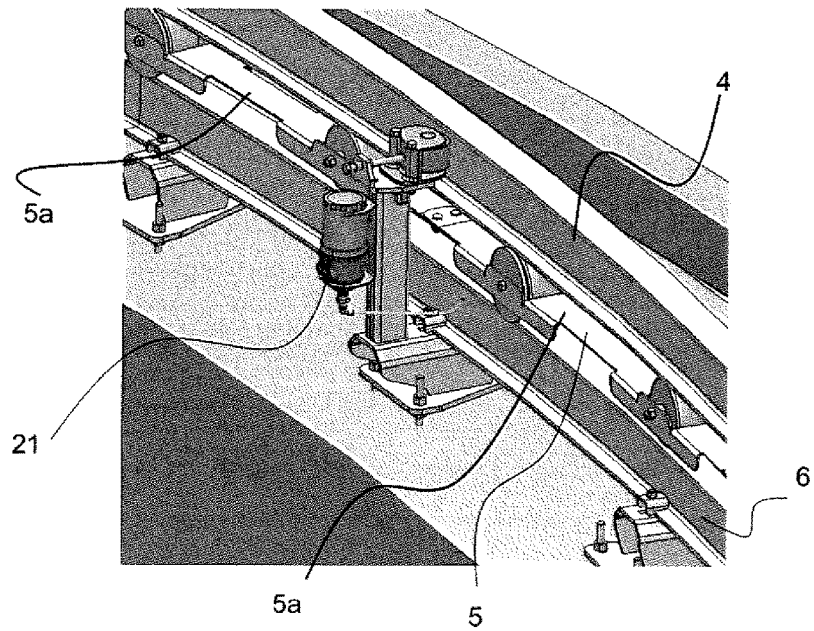
FIG. 8 is a further isometric view illustrating detail of the platform from above, with its deck removed for ease of explanation.
Figure 9:
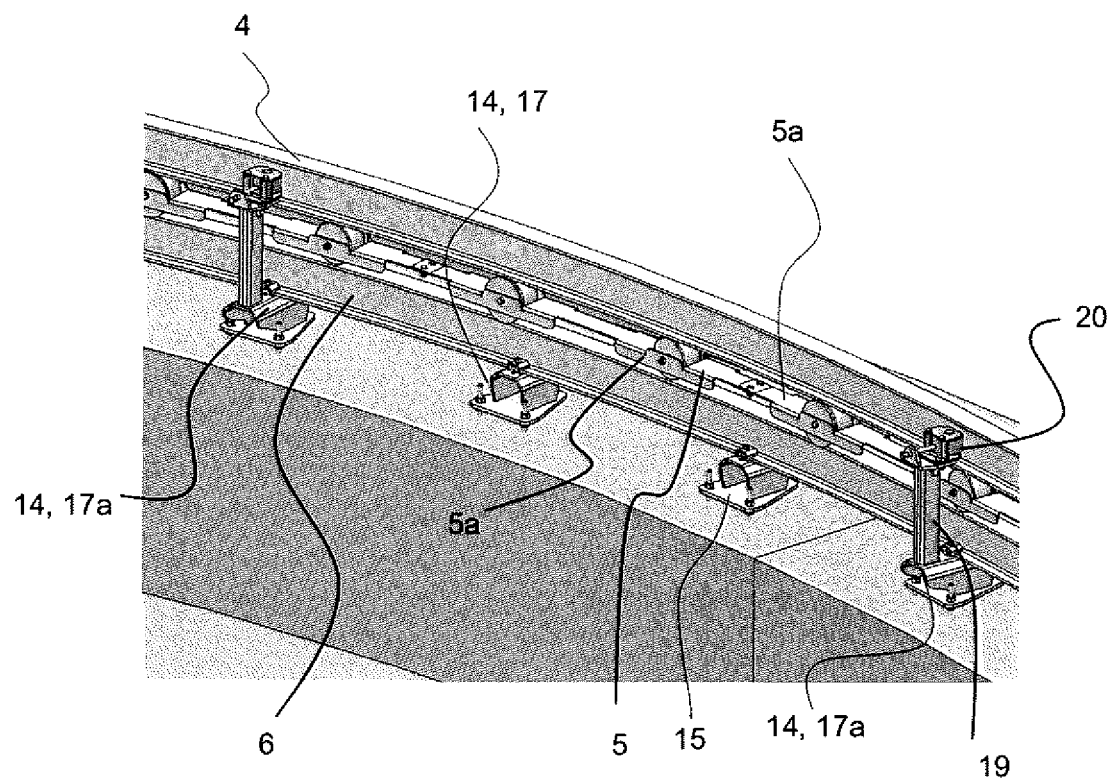
FIG. 9 is another isometric view illustrating detail of the platform from above, with its deck is removed.
Figure 10:
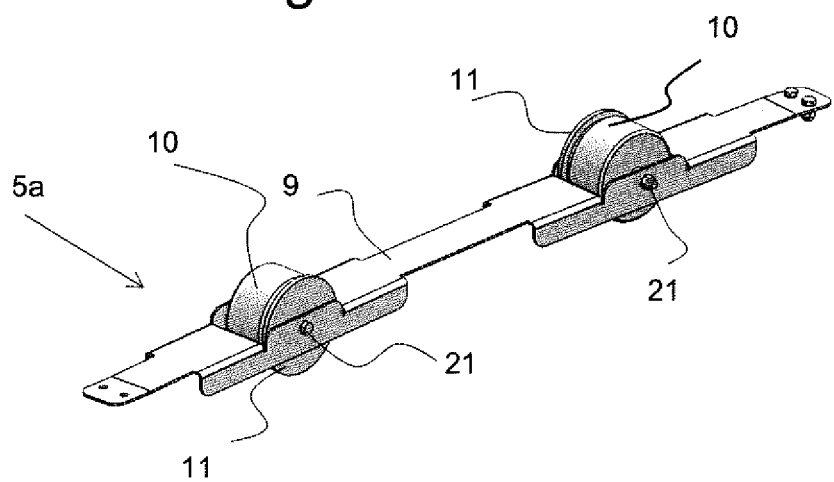
FIG. 10 is an isometric view of a carriage forming part of the platform.

Referring to FIGS. 8 and 9, the ring of carriages 5 is formed by securing, eg bolting, individual carriages 5a end to end. Referring to FIG. 10, each carriage 5a has a strip-like chassis 9 curved to match the curvature of the upper and lower beams. Each chassis 9 is fitted with a pair of rollers 10, one at or near each end. As shown in FIGS. 10, 11 and 11a, each carriage roller has a flange 11 at one side that has a greater radius than the rest of the roller FIG. 12 illustrates the chassis 9 in more detail. It has bolt holes 12 at either end to facilitate connection to immediately adjacent carriages. As also shown, the chassis has a pair of internal spaces 13 each for rotatably receiving a respective one of the rollers 10.

Referring to FIG. 10, the rollers 10 of each carriage are arranged so that the flanges 11 are one either side of the carriage. In other words, when in use the two flanges 11 face in opposite directions and overlap the sides of the lower beam 6. This stops lateral movement of the carriages 5a so that they cannot slip off the lower beam as they roll along it. In other words, sideways movement of a carriage 5a would bring one or other of its flanges 11 into blocking contact with the lower beam 6. The flanges also overlap the sides of the upper beam 4, respectively, in similar fashion to further assist in keeping the ring of carriages concentrically aligned with the two beams 4, 6. Therefore if a carriage started to slide to the 'left' with respect to the beams 4, the right side flange of one of that carriage's rollers would arrest the movement. And if the carriage was to start to slide to the 'right', the left side flange of the carriage's other roller would arrest the movement.

Figure 13:
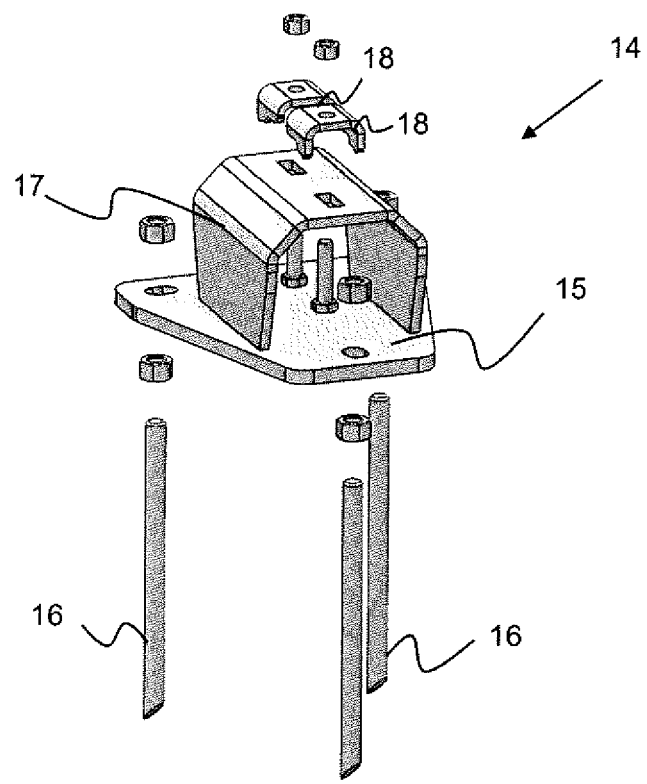
FIG. 13 is an exploded view of a pedestal forming part of the platform.

Referring to FIGS. 9 and 13, the lower beam 4 is held slightly elevated by a series of pedestals 14, each having a base plate 15 fastened on or over a concrete or other foundation or ground surface by way of bolts 16. The bolts enable the height of the plate 15 to be adjusted to help set the lower beam, and therefore the ring of carriages and the upper beam, in a horizontal orientation. A tunnel-like mount 17 extends from the base plate 15 to receive the lower beam 6, and a pair of connectors 18 releasably clamp each side of the lower beam to the mount 17.

Figure 14:
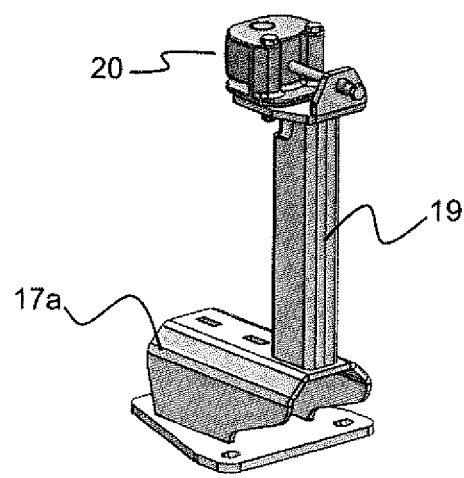
FIG. 14 is an isometric view of a larger one of the pedestals in association with a lateral guide roller.

Referring to FIGS. 9 and 14, some of the pedestals, for example every third one, has a longer mount 17a so as to also support a post 19. The post in turn supports a lateral guide roller 20 which helps keep the upper beam 4 concentrically aligned with the lower beam 6. The guide rollers 20 are not powered, they rather rotate freely.

Referring to FIG. 8, for three of the guide roller arrangements the post 19 also supports a battery powered lubricant dispenser 21 that automatically squirts grease or oil onto the lower beam 6 at timed intervals. This reduces abrasion between beams 4, 6 and the carriage rollers 5, and allows the carriage rollers 10 to slip as needed, ie in case the outer end of each carriage roller moves at a different speed to its inner end given that they are not on the same notional radial arc.

Preferably the rollers 10 of each carriage are cast from a tough durable nylon polymer. They are formed to withstand a 2 tonne loading per roller. Optionally the drive rollers 7 and the lateral guide rollers 20 are formed from compressible polyurethane.

Referring to FIG. 7, when a carriage roller 10 becomes worn and in need of replacement, the associated chassis 9 is unbolted from the carriages in front of and behind it. The upper beam 4 and deck are hydraulically jacked-up, slightly, at least in the vicinity of the carriage, and the freed carriage is then swung laterally through 90° to move its rollers 10 clear of the upper and lower beams. From that position the rollers can be easily accessed, removed and replaced. In this regard the axle that each roller turns on is unbolted from the chassis and pulled away so that the roller drops free. The same axle is used for the replacement roller. The chassis 9 is then swung back into alignment with the upper and lower beams and reconnected to the carriages in front of and behind it.

An advantage of the preferred embodiment is that the rollers 10 do not require bearings, they simply turn on their axle 21 (see FIG. 10). This simplifies replacement of rollers and helps minimize costs.

Figure 15:
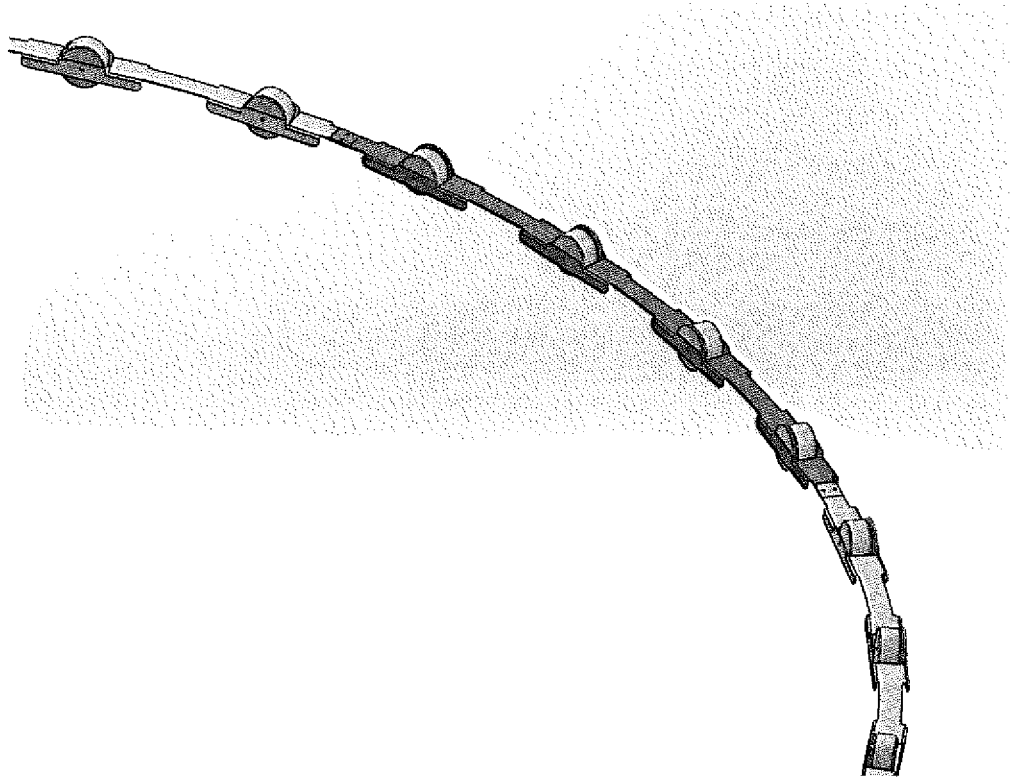
FIG. 15 is an isometric view illustrating part of a ring of longer carriages that may be used in an alternative embodiment of the milking platform.
Figure 16:
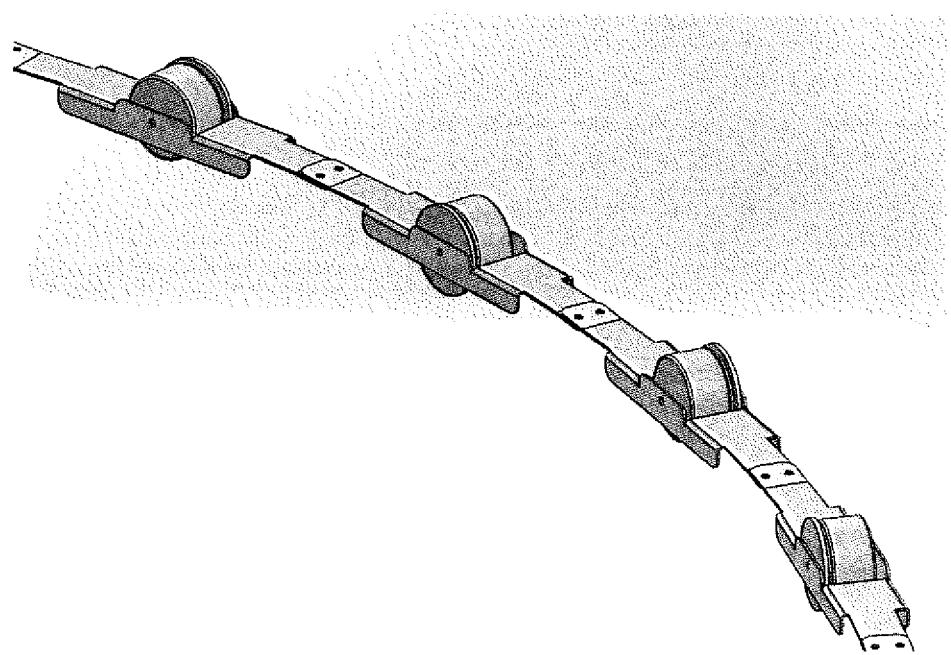
FIG. 16 illustrates an alternative arrangement of the carriages.

In other embodiments of the invention at least some of the carriages may have more than two rollers. However in that case the rollers at the forward half of the carriage will have their flanges on the same side of the carriage, and the rollers at the rear half will all be on the opposite side of the carriage. This will enable the carriage to be rotated through 90°, in the manner described above, for replacement rollers or repairs generally. An example of a ring of carriages made up of, or including, 'four-roller' carriages is shown at FIG. 15. FIG. 16 illustrates a ring of carriages joined end to end for optional use with the platform, where each carriage has only one roller.

While the invention is preferably used for milking dairy cows it can be used in the same or a similar way for milking other animals, for example goats, sheep and buffalo, etc.

While some embodiments of the invention have been described by way of example it should be understood that modifications and improvements can occur without departing from the scope of the following claims.

The invention claimed is:

1. A rotary milking platform comprising:
a deck;
a circular upper beam connected to and supporting the deck;
a circular lower beam; and
a series of carriages connected end to end to form a ring between the beams;
the platform formed such that:
the upper beam is arranged to rest and rotate on the ring of carriages to rotate the deck;
each carriage has at least one carriage roller;
each carriage roller is arranged to rotate on the lower beam;
each carriage roller has a retention flange at only one side;
the flanges of some of the rollers are at or adjacent an inner side of the ring and the flanges of others of the rollers are at or adjacent an outer side of the ring;
the flanged rollers of the ring are arranged such that at least one flanged roller is oriented with its one flange at one side of the ring and another flanged roller next to the at least one flanged roller is oriented with its one flange at a side of the ring opposite to said one side;
the flanges prevent the carriages from moving off the lower beam when the platform is in use;
at least some of the carriages can be disconnected from the ring and swung laterally to be moved free of the beams for maintenance, repair or replacement; and
the ring of carriages is free to the extent that it can rotate at a different rate to the upper beam.

2. The rotary platform according to claim 1, wherein:
each carriage has at least a pair of the carriage rollers and the flanges within each pair are at opposite sides of the carriage; or
the rollers are arranged in pairs, and each pair is oriented with their flanges on an opposite side of the ring of carriages to a pair of immediately adjacent rollers of the ring.

3. The rotary milking platform according to claim 1, wherein the lower beam is stationary.

4. The rotary milking platform according to claim 1, wherein each flange overlaps an upright side of the lower beam and an upright side of the upper beam.

5. The rotary milking platform according to claim 4, wherein each carriage is releasably connected to another of the carriages immediately before it, and to another of the carriages immediately after it.

6. The rotary milking platform according to claim 5, wherein each carriage has a chassis and at least two carriage rollers, the chassis having at least two internal spaces which receive those rollers, respectively.

7. The rotary milking platform according to claim 6, wherein an axle passes through each carriage roller and fastens that roller to the chassis.

8. The rotary milking platform according to claim 7, wherein the carriages are curved to match the curvature of the upper and lower beams.

9. The rotary milking platform according to claim 1, wherein
the lower beam is stationary;
each flange overlaps an upright side of the lower beam and an upright side of the upper beam;
each carriage is releasably connected to another of the carriages immediately before it, and to another of the carriages immediately after it;
each carriage has a chassis connected to at least two carriage rollers, the chassis having at least two internal spaces which receive those rollers, respectively;
an axle passes through each carriage roller and fastens that roller to the chassis;
the carriages are curved to match the curvature of the upper and lower beams;
the ring of carriages is substantially circular; and
each roller has an axis that is radially aligned with a centre of the ring.

10. A method of replacing at least one carriage roller of a rotary milking platform, wherein the rotary milking platform comprises:
a deck;
a circular upper beam connected to and supporting the deck;
a circular lower beam; and
a series of carriages connected end to end to form a ring between the beams:
the platform formed such that:
the upper beam is arranged to rest and rotate on the ring of carriages to rotate the deck;
each carriage has at least one carriage roller;
each carriage roller is arranged to rotate on the lower beam;
each carriage roller has a retention flange at only one side;
the flanges of some of the rollers are at or adjacent an inner side of the ring and the flanges of others of the rollers are at or adjacent an outer side of the ring;
the flanged rollers of the ring are arranged such that at least one flanged roller is oriented with its one flange at one side of the ring and another flanged roller next to the at least one flanged roller is oriented with its one flange at a side of the ring opposite to said one side;

the flanges prevent the carriages from moving off the lower beam when the platform is in use; and at least some of the carriages can be disconnected from the ring and swung laterally to be moved free of the beams for maintenance, repair or replacement:

the method comprising the steps of:

disconnecting the carriage from immediately adjacent carriages, swinging the disconnected carriage laterally to position its roller(s) clear of the upper and lower beams;

replacing at least one carriage roller;

swinging the carriage into alignment with the beams; and connecting the carriage to two immediately adjacent carriages.

11. A rotary milking platform, wherein the rotary milking platform comprises:

a deck;

a circular upper beam connected to and supporting the deck;

a circular lower beam; and a series of carriages connected end to end to form a ring between the beams;

the platform formed such that:

the upper beam is arranged to rest and rotate on the ring of carriages to rotate the deck;

each carriage has at least one carriage roller;

each carriage roller is arranged to rotate on the lower beam;

each carriage roller has a retention flange at only one side;

the flanges of some of the rollers are at or adjacent an inner side of the ring and the flanges of others of the rollers are at or adjacent an outer side of the ring;

the flanged rollers of the ring are arranged such that at least one flanged roller is oriented with its one flange at one side of the ring and another flanged roller next to the at least one flanged roller is oriented with its one flange at a side of the ring opposite to said one side;

the flanges prevent the carriages from moving off the lower beam when the platform is in use; and at least some of the carriages can be disconnected from the ring and swung laterally to be moved free of the beams for maintenance, repair or replacement;

wherein each carriage comprises more than two of the flanged rollers and for each carriage some of these are at a forward half of the carriage and some of them are at a rearward half of the carriage, wherein the flanged rollers at the forward half of the carriage each have their flange at the same side of the carriage, and the flanged rollers at the rearward half of the carriage each have their flange at an opposite side of the carriage to those of the forward half of the carriage.

\* \* \* \* \*